United States Patent [19]

Otstot et al.

[11] 4,380,460
[45] Apr. 19, 1983

[54] GAS SEPARATION APPARATUS

[75] Inventors: Roger S. Otstot; Charles J. Runkle, both of Raleigh, N.C.

[73] Assignee: Monsanto Company, St. Louis, Mo.

[21] Appl. No.: 332,912

[22] Filed: Dec. 21, 1981

[51] Int. Cl.³ .............................................. B01D 53/22
[52] U.S. Cl. .................................. 55/158; 210/321.1; 210/456
[58] Field of Search ................... 55/16, 158; 165/158; 210/321.1, 321.2, 321.3, 433.2, 456, 500.2

[56] References Cited

U.S. PATENT DOCUMENTS

| | | | |
|---|---|---|---|
| 3,339,341 | 9/1967 | Maxwell et al. | 55/158 X |
| 3,526,275 | 9/1970 | Vance et al. | 165/158 |
| 3,832,830 | 9/1974 | Gerow | 55/158 |
| 3,838,776 | 10/1974 | Brun et al. | 210/456 X |
| 4,031,012 | 6/1977 | Gics | 55/158 X |
| 4,201,673 | 5/1980 | Kanno et al. | 210/456 X |
| 4,219,426 | 8/1980 | Spekle et al. | 210/456 X |
| 4,308,654 | 1/1982 | Bogart | 55/16 X |
| 4,341,631 | 7/1982 | Hargitay | 210/433.2 X |

Primary Examiner—Robert H. Spitzer
Attorney, Agent, or Firm—Robert L. Broad

[57] ABSTRACT

Apparatus for separating one gas from a mixture of gases wherein a cylindrical shell having openings for admitting and discharging a mixture of gases surrounds a bundle of hollow fiber membranes which extend through a tube sheet mounted in one end of the cylindrical shell. A resilient sheet in the form of a slit tube surrounds the bundle of fibers and is attached at one end thereof to the tube sheet. The remainder of the slit tube is free of restraint such that it is expanded into contact with the inner surface of the shell. In a preferred embodiment, the slit tube is secured to a tubular distribution element having one end thereof positioned inside the slit tube and the other end thereof secured to the tube sheet, the distribution element being provided with ports for allowing the gas mixture to enter the bundle of fibers.

11 Claims, 4 Drawing Figures

U.S. Patent
Apr. 19, 1983
4,380,460
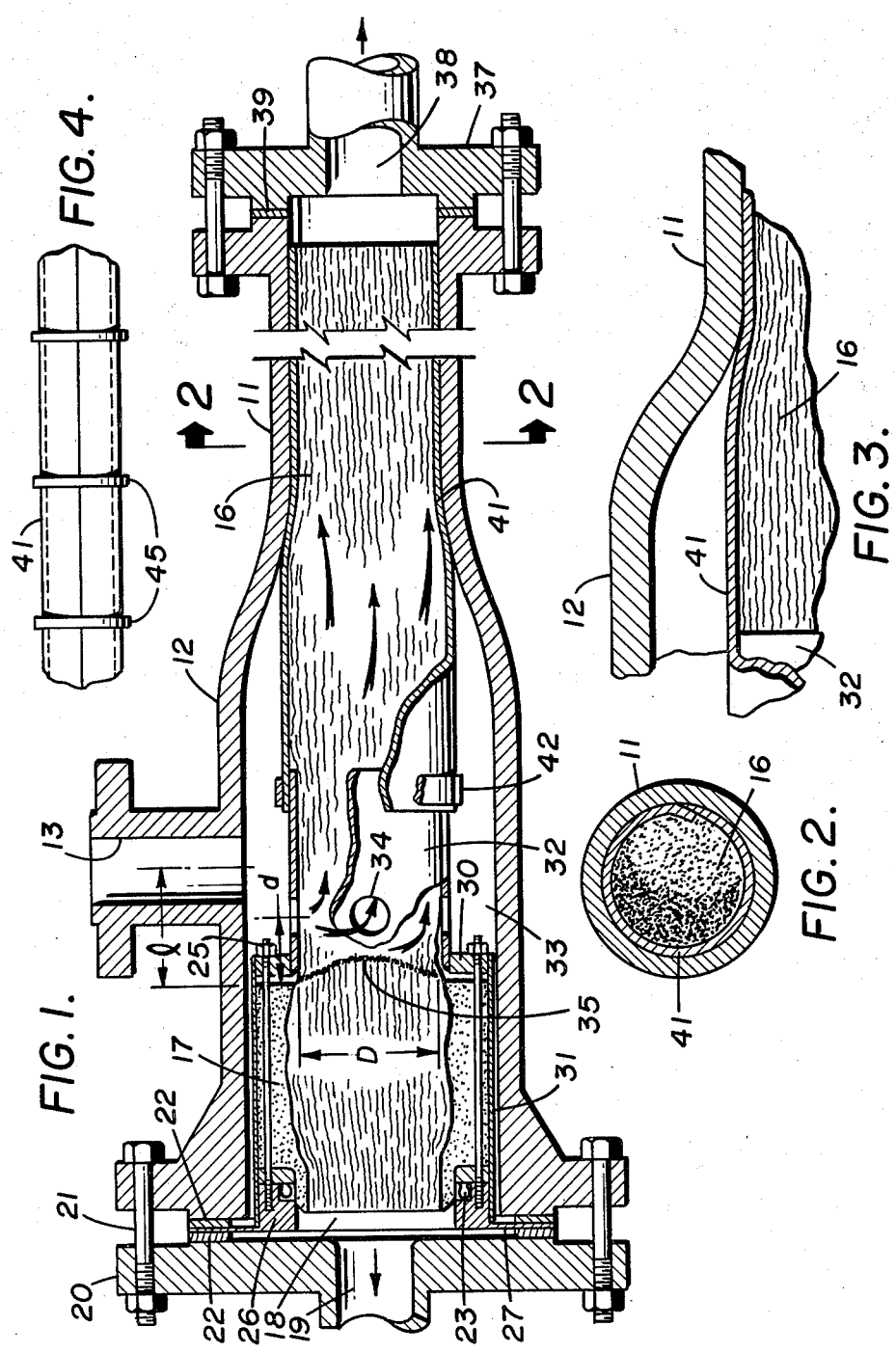

GAS SEPARATION APPARATUS

BACKGROUND OF THE INVENTION

A. Field of the Invention

This invention relates to apparatus for separating one gas from a mixture of gases.

B. Prior Art

It is known to utilize a bundle of hollow fiber membranes positioned in a cylindrical shell for separating one gas from a mixture of gases by allowing the one gas to permeate from the mixture through the walls of the hollow fiber membranes to the bores thereof. The hollow fiber membranes are normally made from a polymeric material and, as a result, are susceptible to damage during handling or installation of the bundle into a shell. Also, the steel shells used for this purpose frequently contain scale, rust, dirt or other particulate matter which can damage the hollow fiber membranes during assembly of the bundle in the shell or during subsequent operation of the apparatus. It is possible to thoroughly clean the interior of the shell prior to insertion of the bundle of fibers, but this is time consuming and expensive. Various approaches have been taken for protecting hollow fibers or tubes in heat exchangers and gas permeation apparatus against damage during handling.

U.S. Pat. No. 3,526,275 discloses a heat exchanger utilizing tubular polymeric heat exchange elements. In order to protect the tubular elements during shipment, the elements are surrounded by a perforated, rigid metal sleeve. While this may protect the tubular elements during shipment, it does nothing for protecting the tubular elements from scale and other debris found in the steel shell, this material being free to enter the bundle through the openings in the rigid sleeve.

U.S. Pat. No. 3,339,341 discloses permeation apparatus wherein a bundle of hollow fiber membranes is positioned in a tubular shell. For protecting the bundle of fibers and for reducing the cross-sectional dimension of the fiber bundle during insertion of the bundle in the shell, a flexible, porous sleeve member, preferably in the form of a circular knit fabric sleeve, encloses the fiber bundle. The primary purpose of this sleeve is apparently to effect a reduction in the cross-sectional area of the bundle during assembly in the shell. The patent states that this sleeve also protects the fibers during assembly and operation of the apparatus. It is not believed, however, that this sleeve will offer much protection to the hollow fiber membranes from scale and other gritty material frequently found in such shells, since this material can freely make its way through the knit fabric and into the fiber bundle.

SUMMARY OF THE INVENTION

Apparatus for separating one gas from a mixture of gases wherein a bundle of hollow fiber membranes is positioned in a cylindrical shell having an inlet for admitting a gas mixture and an outlet for discharge of unpermeated gas, the bundle of hollow fiber membranes extending through a polymeric tube sheet secured in one end of the cylindrical shell. A resilient sheet having the form of a slit tube positioned in the shell in a position surrounding the bundle of fibers is secured at one end to the tube sheet, the remainder of the slit tube being free of restraint and expanded into contact with the inner surface of the shell.

DESCRIPTION OF THE DRAWINGS

FIG. 1 is a cross-sectional view of the apparatus of this invention showing the arrangement of the various elements of the invention.

FIG. 2 is a cross-sectional view taken on line 2—2 of FIG. 1 showing the manner in which the slit tube and fiber bundle are expanded into contact with the inner surface of the shell.

FIG. 3 is an enlarged fragmentary cross-sectional view showing the manner in which a gas distribution element positioned in the end of the slit tube forces the slit tube into contact with the inner surface of the shell.

FIG. 4 is a fragmentary view showing rings which are used to hold the slit tube and fiber bundle in a compressed configuration during shipping of the module.

DETAILED DESCRIPTION OF THE INVENTION

Referring now in detail to the drawing, there is shown a cylindrical steel shell 11 having an enlarged end portion 12 which is provided with an inlet 13 for the admission of a mixture of gases from which one of the gases is to be removed. A bundle of hollow fiber membranes 16 positioned in and extending the length of the shell 11 extends through a polymeric tube sheet 17 which is positioned in the end of the enlarged portion 12 such that a fluid permeating through the walls of the fibers 16 to the bores thereof can pass through the tube sheet 17 to a chamber 18. Permeated gas from the chamber 18 exits from the apparatus through an outlet 19 in a cover plate 20 secured to the enlarged end portion 12 by bolts 21. Gaskets 22 and a seal 23 prevent leakage of the gases.

The tube sheet 17 is secured by bolts 25 to an annular element 26 having a flange 27 positioned between the gaskets 22 for holding the tube sheet. Attached to the other ends of the bolts 25 is a ring 30 to which is welded a tube 31 which surrounds and protects the tube sheet 17 during handling. Also welded to the ring 30 is a tubular distribution element 32 which extends into the enlarged end portion 12 of the shell in a position surrounding the bundle of filaments 16. The distribution element, which cooperates with tube sheet and the enlarged end portion 12 to form an annular chamber 33 surrounding the distribution element, is provided with a plurality of ports 34 for allowing gases entering the inlet 13 to pass from the annular chamber 33 through the distribution element into the bundle of fibers 16. The ports 34 lie in a plane perpendicular to the axis of the shell 11 and are positioned such that $$0.4 \leq l/D \leq 1.3$$

$$0.2 \leq d/D \leq 0.6$$

where d is the distance from the face of the tube sheet to the center of the port 34, l is the distance from the face of the tube sheet to the center of the inlet 13 and D is the diameter of the fiber bundle at the face of the tube sheet. This positioning of the ports 34 prevents erosion of the hollow fiber 16 by the gas mixture entering the inlet 13. This positioning of the ports 34 also reduces the possibility for damage to the fibers 16 adjacent to the tube sheet 25, the fibers 16 being most fragile at this point.

The tube sheet 17 is formed by suspending the fiber bundle 16 with the lower end in a mold and then pouring a casting resin into the mold. Before and during the curing of this resin to form the tube sheet, the resin wicks upward through the fiber bundle. The distance that the resin wicks increases with bundle diameter and is greatest at the center of the bundle. In and adjacent to this wicked region the fibers are most brittle and fragile, apparently because of the heat applied to the fibers during the curing of the tube sheet. Reference numeral 35 indicates the end of the wicked region. Positioning of the ports 34 as described herein substantially eliminates damage to the fiber by gases flowing into the apparatus at a high velocity.

The opposite end of the shell 11 is provided with a second cover plate 37 bolted to the shell 11 and having an outlet 38 for the discharge of unpermeated gases from the gas mixture. A gasket 39 positioned between the shell 11 and the cover plate 37 serves to prevent leakage of the unpermeated gas mixture. The ends of the fibers 16 adjacent to the cover plate 37 are sealed so that the only outlet for the permeated gas from the bores of the fibers is through the tube sheet 17.

Positioned inside the shell 11 and surrounding the bundle of fibers 16 is a resilient sheet having the form of a slit tube 41 which serves to protect the fibers 16 during handling and operation, this slit tube normally, i.e., when free of restraint, having a diameter greater than the inner diameter of the shell. One end of the slit tube 41 surrounds the tubular distribution element 32 and is secured thereto by a hose clamp 42 of a well known type.

The slit tube 41 is made from a sheet of resilient material, such as thin stainless steel, such that it can be compacted laterally to a tubular configuration having a diameter less than the inner diameter of the shell 11. The slit tube 41 can be held in this tubular configuration, with the edges overlapped, during shipping and handling. Then, when the slit tube is inserted in the shell 11 and free of restraint, the resiliency of this slit tube causes it to expand into contact with the inner surface of the shell 11. The sheet from which the slit tube is made is sufficiently wide that the edges remain overlapped after the slit tube has expanded to fill the shell. The fibers 16 are thus in contact with the smooth, clean inner surface of the slit tube 41 and scale and other debris from the shell 11 cannot enter the fiber bundle. For some applications the slit tube 41 may be perforated but it is preferred that it be imperforate.

The outer diameter of the tubular distribution element 32 is at least as large as the inner diameter of the shell 11, so that the slit tube 41 is forced into contact with the end of the cylindrical shell 12 to reduce the possibility of leakage of the fluid mixture between the shell 11 and the slit tube 41. Preferably, the outer diameter of the distribution element 32 is greater than the inner diameter of the shell 11 such that the slit tube is forced into very tight contact with the end of the cylindrical shell 11 adjacent to the enlarged end portion 12. This is best illustrated in FIG. 3.

In use of this apparatus, a module comprising the tube sheet 17, the distribution element 32 and slit tube 41 surrounding the bundle of fibers 16 will be shipped to the place of use and inserted in the shell 11 at that point. During shipping, the slit tube 41 is laterally compressed around the bundle of fibers 16 to a tubular configuration having a diameter less than the inner diameter of the shell 11. The slit tube is preferably held in this laterally-compressed configuration by a plurality of rings 45 (FIG. 4) which encircle the slit tube at spaced intervals thereon. The rings 45 are slidably mounted on the slit tube such that, when the module is inserted in the shell, they can be slid to one end of the slit tube, or removed entirely, to allow the slit tube to expand and fill the shell. This allows the fiber bundle to open so that the fibers separate for a better flow of the gas mixture through the fiber bundle.

A gas mixture is passed into the shell 11 through the inlet 13 and then passes through the ports 34 into the bundle of fibers. As the gas mixture passes through the shell 11 to the outlet 38, at least one of the gases will permeate the walls of the fibers to the bores thereof and be withdrawn from the apparatus through the outlet 19.

What is claimed is:

1. Apparatus for separating one gas from a mixture of gases, comprising
   a. a cylindrical shell having an inlet for admitting a gas mixture into the shell and an outlet for discharge of unpermeated gases from the shell,
   b. a bundle of hollow fiber membranes positioned in the shell, said membranes being more permeable to one of the gases of the mixture than the others,
   c. a tube sheet positioned in the shell at one end of the bundle of hollow fibers, said fibers extending through the tube sheet, and
   d. a resilient sheet having the form of a slit tube positioned in the shell in a position surrounding the bundle of fibers, one end of said slit tube being secured to the tube sheet, the remainder of said slit tube being free of restraint and expanded into contact with the inner surface of the shell.

2. The apparatus of claim 1 wherein the slit tube normally has a diameter greater than the inner diameter of the shell.

3. The apparatus of claim 1 wherein the cylindrical shell has an enlarged portion at one end thereof, said tube sheet being positioned in said enlarged portion, a tubular distribution element secured to the tube sheet and extending into the end of the slit tube, said slit tube being secured to the tubular distribution element, said tubular distribution element having therein a port for admitting the gas mixture from the shell into the bundle of fibers, said inlet in the shell being in said enlarged portion.

4. The apparatus of claim 3 wherein the length of the tubular element is less than the length of the enlarged portion of the shell.

5. The apparatus of claim 4 wherein the outer diameter of the tubular element is at least as great as the inner diameter of the shell such that the slit tube is held in contact with the inner surface of said one end of said cylindrical shell.

6. The apparatus of claim 4 wherein the outer diameter of the tubular element is greater than the inner diameter of the cylindrical shell.

7. The apparatus of claim 4 wherein the edges of the resilient sheet from which the slit tube is formed are overlapped.

8. The apparatus of claim 7 wherein the port is positioned such that $$0.4 \leq l/D \leq 1.3$$

$$0.2 \leq d/D \leq 0.6$$

where d is the distance from the tube sheet to said port, l is the distance from the tube sheet to the inlet in the shell and D is the diameter of the bundle of fibers.

9. The apparatus of claim 8 wherein said tubular element is provided with a plurality of said ports arranged in a plane perpendicular to the axis of said tubular element.

10. The apparatus of claim 8 wherein said outlet is at the end of the shell remote from said enlarged end portion.

11. Apparatus for separating one gas from a mixture of gases, comprising
   a. a cylindrical shell having an enlarged end portion, said end portion having therein an inlet for admitting the gas mixture into the shell,
   b. a bundle of hollow fiber membranes positioned in the shell, said membranes being more permeable to one of the gases of the mixture than the other,
   c. a tube sheet positioned in said enlarged end portion, said fibers extending through said tube sheet, the opposite ends of said fibers being sealed,
   d. a first cover plate secured to the enlarged end portion for closing said end portion, said cover plate having therein an outlet opening for permeated gas,
   e. an annular element secured to the tube sheet at the end of the shell and having a flange positioned between the cover plate and the enlarged end portion for holding the tube sheet,
   f. a ring secured to the tube sheet inside said enlarged end portion,
   g. a tube secured to the ring in a position surrounding the tube sheet,
   h. a tubular distribution element secured to the ring and extending into said enlarged end portion, said distribution element having therein a port for admitting the gas mixture from the shell into the bundle of fibers,
   i. a resilient sheet having the form of a slit tube positioned in the shell in a position surrounding the bundle of fibers, the end of the slit tube surrounding the end of the tubular distribution element,
   j. a clamp for holding the end of the slit tube on the end of the distribution element, the remainder of the slit tube being free and expanded into contact with the inner surface of the shell, and
   k. a second cover plate secured to the cylindrical shell adjacent to the sealed ends of the fibers and having therein an outlet for discharging unpermeated gases from the shell.

* * * * *